United States Patent
Moharil et al.

(10) Patent No.: US 9,164,928 B2
(45) Date of Patent: Oct. 20, 2015

(54) VALIDATION OF CACHE LOCKING USING INSTRUCTION FETCH AND EXECUTION

(71) Applicant: International Business Machines Corporation, Armonk, NY (US)

(72) Inventors: Rahul S. Moharil, Pune (IN); Lakshmi Sarath

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 290 days.

(21) Appl. No.: 13/899,879

(22) Filed: May 22, 2013

(65) Prior Publication Data

US 2014/0351517 A1    Nov. 27, 2014

(51) Int. Cl.
*G06F 12/00* (2006.01)
*G06F 12/14* (2006.01)
*G06F 12/08* (2006.01)
*G06F 12/12* (2006.01)

(52) U.S. Cl.
CPC ........ *G06F 12/1483* (2013.01); *G06F 12/0811* (2013.01); *G06F 12/0871* (2013.01); *G06F 12/12* (2013.01)

(58) Field of Classification Search
None
See application file for complete search history.

(56) References Cited

U.S. PATENT DOCUMENTS

| | | | |
|---|---|---|---|
| 5,511,178 A * | 4/1996 | Takeda et al. | 711/125 |
| 6,044,478 A | 3/2000 | Green | |
| 6,438,655 B1 | 8/2002 | Nicol et al. | |
| 7,222,217 B2 | 5/2007 | Gray | |
| 2007/0250667 A1 * | 10/2007 | Dement et al. | 711/136 |
| 2008/0126068 A1 * | 5/2008 | O'Niell et al. | 703/20 |

\* cited by examiner

*Primary Examiner* — Aimee Li
*Assistant Examiner* — Jason Blust (57) ABSTRACT

A technique for locking a cache memory device (or portion thereof) which includes the following actions: (i) writing full traversal branching instructions in a cache way of a cache memory device; and (ii) subsequent to the writing step, locking the cache way. The locking action is performed by adjusting cache locking data to indicate that data in the cache way will not be overwritten during normal operations of the cache memory device. The writing action and the locking action are performed by a machine.

21 Claims, 4 Drawing Sheets

VALIDATION OF CACHE LOCKING USING INSTRUCTION FETCH AND EXECUTION

FIELD OF THE INVENTION

The present disclosure relates generally to the field of caches, and more particularly to methods for locking caches, and even more particularly to locking a Level 2 (L2) cache.

BACKGROUND OF THE INVENTION

The Level 2 (or L2) cache is part of a multiple level storage strategy for data stored by computer central processing units (CPUs). The multiple level caching scheme bridges the gap between: (i) the relatively fast CPU; and (ii) the relatively slow random access memory (RAM). The L2 cache is typically built into the motherboard, but some CPUs now incorporate an L2 cache. Typically, L2 caches are associative and characterized by a number of "ways" and a number of "sets."

The L2 cache may be locked using a Replacement Management Table (RMT). The cache has a copy of recently fetched instructions, or recently accessed data in memory which enables the processor to access these locations faster. Sometimes for performance enhancement it would be required to maintain certain memory locations in cache permanently so that accesses to these locations will always get cache hits. Cache locking prevents replacement of instructions or data entries stored in the cache. Cache locking can be done for the entire cache or for individual ways in the cache.

A Replacement Management Table (RMT) is typically used for cache locking when one or more of the n ways of an n-way associative cache are not eligible to be replaced for a given classID, which is specified in range registers. The number of ways to be locked is typically specified using RMT setup registers. The general validation process of RMT locking and the phases involved in RMT cache locking, in order, are as follows: (i) test case generation; (ii) test case execution; and (iii) error checking. Some embodiments of the present disclosure focus on the foregoing phases (i) and (ii), and allow for the use of any checker method in phase (iii), so long as the checker method is supported by the validation support tool.

Bringing addresses from memory to cache, as "instruction fetches" using instruction range registers, entails many challenges. Some conventional techniques will now be described in the following paragraphs.

Normal code execution happens sequentially, thus executing all instructions in a current cache line (depending on the cache line size) before proceeding to the next cache line. Bringing a line to cache requires execution of only one instruction per line. Loops in the code stream will lead to the same instructions being executed repeatedly. For this reason, execution of a set of bulk instructions in sequential mode can be a less than optimal approach for creation (also called "population") of valid lines in the to-be-locked cache way.

The following table shows the number of sequential instructions to be executed, in the worst case scenario for population of an 8-way associative, 1 megabyte (MB) L2 cache with cache line size of 128 bytes (that is, 1024 bits per cache line):

| Number of ways to be populated and locked | Number of sequential instructions to be executed |
| --- | --- |
| 1 | 32 * 1024 |
| 2 | 64 * 1024 |

As will be appreciated from the above table, writing specific code of a sequential nature for verification of L2 Cache Locking can make the entire validation tool (that is, the executable file used to implement the tool) more bulky and less scalable, depending on the coverage required.

Another technique for validation of L2 cache locking is re-execution of a random test case, first for locking and then for verification. However, this approach does not guarantee that all the cache lines, in the way to be locked, are populated with test case information. For example, in random test cases, pages in the virtual memory may be mapped to discontinuous pages in the real memory. The L2 cache is populated based on the real address of the instruction/data to be fetched. For this reason, cache lines can potentially be fetched in a disordered manner. This technique also does not necessarily allow a systematic approach for post-locking verification of the content in a locked way.

Another technique for validation of L2 cache locking is execution of loads and stores of data for populating valid lines and locking the valid lines in the L2 cache. This technique does not use instruction side registers and corresponding locking mechanisms. For this reason, this technique prevents validation of the instruction side facility provided for purposes of L2 cache locking.

SUMMARY

According to an aspect of the present invention, there is a method for locking a way in a cache. The method includes the following steps (not necessarily in the following order): (i) writing full traversal branching instructions in the way; and (ii) subsequent to the writing step, locking the way. The writing step and the locking step are performed by a computer.

DETAILED DESCRIPTION

This detailed description section will be divided into the following sub-sections: (i) The Hardware and Software Environment; (ii) Operation of embodiment(s) of the present disclosure; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
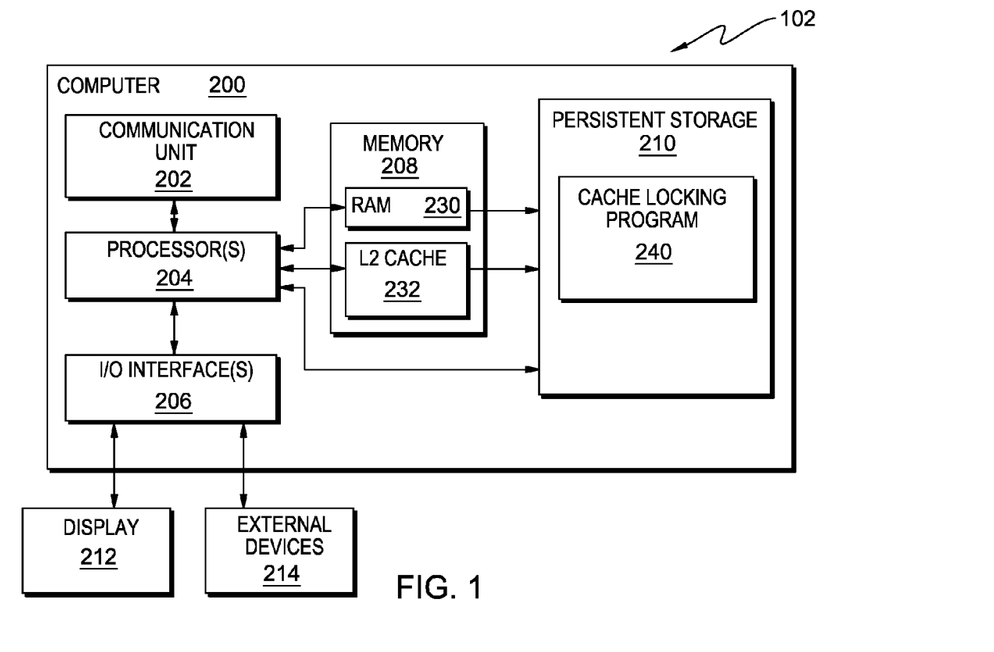
FIG. 1 is a schematic view of a first embodiment of a computer system according to the present disclosure.

An exemplary hardware and software environment, in which a first embodiment of the present invention exists and/or operates, will now be discussed with reference to FIG. 1. FIG. 1 is a functional block diagram computer system 102, including: computer 200; communication unit 202; processor(s) (or processor set) 204; input/output (i/o) unit 206; memory device 208; persistent storage device 210; display device 212; external devices 214; random access memory (RAM) device 230; L2 cache memory device 232; and cache locking program 240. Several portions of data processing system 102 will now be discussed in the following paragraphs.

Computer 200 may be a laptop computer, tablet computer, netbook computer, personal computer (PC), a desktop computer, a personal digital assistant (PDA), a smart phone, or any programmable electronic device. Program 240 is representative software, and is a collection of machine readable instructions and data that is used to create, manage and/or control certain software functions that will be discussed in detail below in the Operation Of Embodiment(s) of the present disclosure sub-section, below, of this section.

It should be appreciated that computer system 102 is only an illustration of one implementation and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 1, computer 200 is schematically shown as a block diagram with many double arrows. These double arrows (no separate reference numerals) represent a communications fabric, which provides communications among various components of data processing system 102. This communications fabric can be implemented with any architecture designed for passing data and/or control information between processors (such as, microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external devices 214 may be able to supply, some or all, memory for data processing system 102; and/or (ii) devices external to data processing system 102 may be able to provide memory for data processing system 102.

Cache Locking Program 240 is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

Media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems (not shown) or devices (not shown) external to data processing system 102. Communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with computer 200. For example, I/O interface 206 provides a connection to external device 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

In computer 200, L2 cache is separate from processor set 204. Alternatively, L2 cache 232. Although some preferred embodiments of the present invention are directed to locking an L2 cache, other embodiments may lock other types of caches (now known or to be developed in the future).

II. Operation of Embodiment(s) of the Present Disclosure

Figure 2:
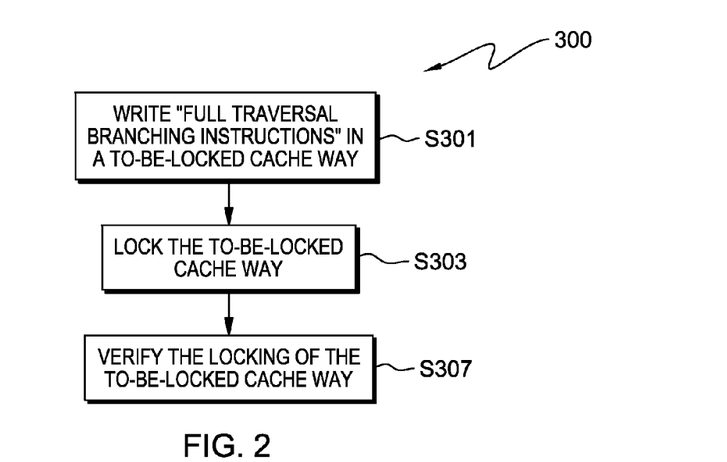
FIG. 2 is a flowchart showing a first embodiment of a process according to the present disclosure which may be performed, at least in part, by the first embodiment computer system.
Figure 3:
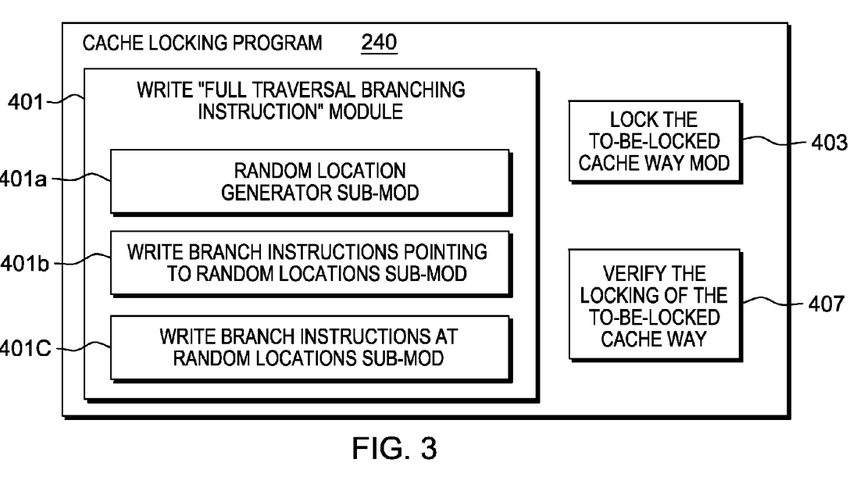
FIG. 3 is a schematic view of a portion of the first embodiment computer system.

Preliminary note: The flowchart and block diagrams in the following FIGS. 2 and 3 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As shown in FIG. 2, process 300 starts at step S301 where: (i) a cache (or a "way" in a cache) that is to-be-locked is identified; and (ii) write "full traversal branching instructions" module (mod) 401 (see FIG. 3) writes "full traversal" type branching instructions 401a, 401b, 401c to the to-be-locked cache.

The concept of "full traversal branching instructions" will now be discussed and defined. Full traversal branching instructions (or FTBIs) are a set of instructions 401a, 401b, 401c that will, when executed, perform a branching instruction on each and every line of the cache way in which the FTBIs are written, with the possible exception of the last line in the traversal order which will have a "return to code instruction." A couple of specific examples of FTBIs will be discussed in the Further Comments And/Or Embodiment(s) sub-section of this DETAILED DESCRIPTION section.

In some embodiments of FTBIs, the branching instruction will include a branching instruction written at a random (see Definitions sub-section of this DETAILED DESCRIPTION section) location in each and every line of the cache way in which the FTBIs are written, with the possible exception of the last line in the traversal order. These embodiments are herein called random FTBIs (or RFTBIs). The specific examples of FTBIs that will be discussed in the Further Comments And/Or Embodiment(s) sub-section of this section are RFTBIs.

In some embodiments of RFTBIs, the branching instructions will include a branching instruction written at the beginning, or end, of each and every line of the cache way in which the FTBIs are written, with the possible exception of the last line in the traversal order. These embodiments are herein called terminal RFTBIs (or TRFTBIs). The specific examples of FTBIs that will be discussed in the Further Comments And/Or Embodiment(s) sub-section of this section are TRFTBIs.

After step S301 is completed, processing proceeds to step S303 where lock the to-be-locked cache way mod 403 (FIG. 3) locks the to-be-locked cache way. The locking of the cache, or cache way, may be accomplished by any techniques now conventional or to be developed in the future.

Processing proceeds to step S307 where verify the locking of the to-be-locked cache way mod 407 (FIG. 3) verifies the locking of the locked way. The verification of the proper locking of the cache, or cache way, may be accomplished by any techniques now conventional or to be developed in the future. A more detailed example of verification will be discussed in the following sub-section of this section.

III. Further Comments and/or Embodiment(S)

Some embodiments of the present disclosure provide an efficient algorithm to generate a test case, for locking of a to-be-locked way of cache (for example, an L2 cache), which "fills up" the entire portion of cache to be locked using only a relatively small number of instructions. This can allow the validation tool to remain at a relatively small size.

One method embodiment of the present disclosure begins by allocating a contiguous memory region of (C*B) bytes in size during run-time and populating it with one randomly placed branch instruction intended for each cache line (except a "last-executed" or "return to code" line). In some embodiments, branch instructions are placed such that a random jump to any branch instruction leads to execution of instructions in the remaining subsequent cache lines through the end of the locked cache (or way of the cache—see Definitions sub-section of this section). In some embodiments, the exit point in the last cache line of the locked way is predetermined. In some embodiments, the population of the way starts with jumping to beginning of the designated memory region, and then traversing through the entire way by traversing new cache lines as early as possible with a relatively low number of instructions.

Some embodiments of the present disclosure may have one or more of the following potential advantages: (i) tight and uninterrupted execution of instructions in a designated memory block ensures that the targeted way gets populated with only the expected content; (ii) tight and uninterrupted execution of instructions in a designated memory block ensures validation of content in all cache lines of locked way; (iii) provides finer control on the instructions to be placed in designated (C*B) region which simplifies the verification process; (iv) run-time allocation of memory reduces the size of the validation tool; (v) this method of populating the locked ways can pave the way for simple error-checking methods; and (vi) the fetch and execution of instructions ensures validation of the instruction-side mechanism provided for creation and locking of L2 content.

Figure 4:
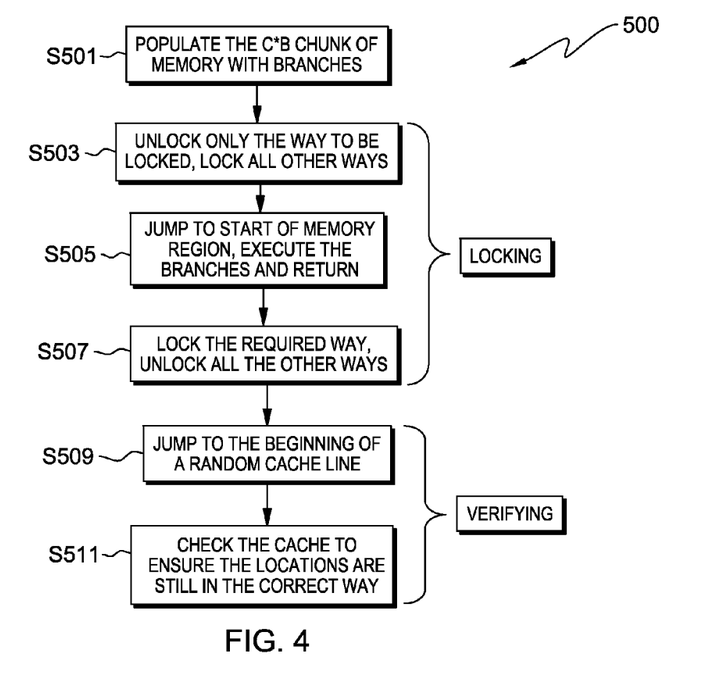
FIG. 4 is a flowchart showing a second embodiment of a process according to the present disclosure.

A method according to the present disclosure will now be explained in detail with reference to the flow chart of process 500 shown in FIG. 4. As shown in FIG. 4, processing begins at step S501 where the control logic (not shown) populates a C*B chunk (or region) of memory with branches. As will be seen below, these are terminal random full traversal branching instructions (TRFTBIs). C is the total number of cache lines in a way. B is the number of bytes in each cache line. The memory region of C*B bytes (preferably aligned on a page boundary) is: (i) allocated at run-time; and (ii) populated with at least two branch instructions per cache line.

Processing proceeds to step S503 where the control logic (not shown) unlocks the to-be-locked way, but locks all other ways of the L2 cache.

Processing proceeds to step S505 where the control logic (not shown) jumps to the start of the C*B memory region and executes the branch instructions and return of the to-be-locked way. This means that the logic jumps to the start of the region, executes the instructions, and returns control to the caller function in the validation tool. Each cache line begins with an unconditional branch to a pseudo-random location within the same cache line which is the start of another branch. In this way, valid lines in the L2 cache are created by bringing the instructions into the to-be-locked way of the L2 cache. The execution of these branch instructions will lead to the end of the to-be-locked way. The last cache line in the to-be-locked way contains a "return to code" instruction. The "return to code" instruction takes the control back to the caller function. In this way, all the cache lines in the to-be-locked way are made to contain instructions from the allocated memory region. The set of instructions written to the cache at step S505 are TRFTBIs, as will be further discussed below in connection with step S509.

Processing proceeds to step S507 where the to-be-locked way is locked, and the other ways in the cache are unlocked. Locking the to-be-locked way is accomplished using appropriate RMT registers. In virtual mode, it is ensured that effective addresses used to access the designated memory region are mapped to real addresses in contiguous manner.

Processing proceeds to step S509 where the verification portion of the process begins. For validating the lock at any time, processing jumps to any random cache line in the locked way. For ease of validation, it is ensured that a branch is present at the beginning of every cache line, so that verification processing can jump to the beginning of any random cache line from the code. Because of the focus on lock validation, this embodiment uses only two (2) branches in a cache line.

Figure 5:
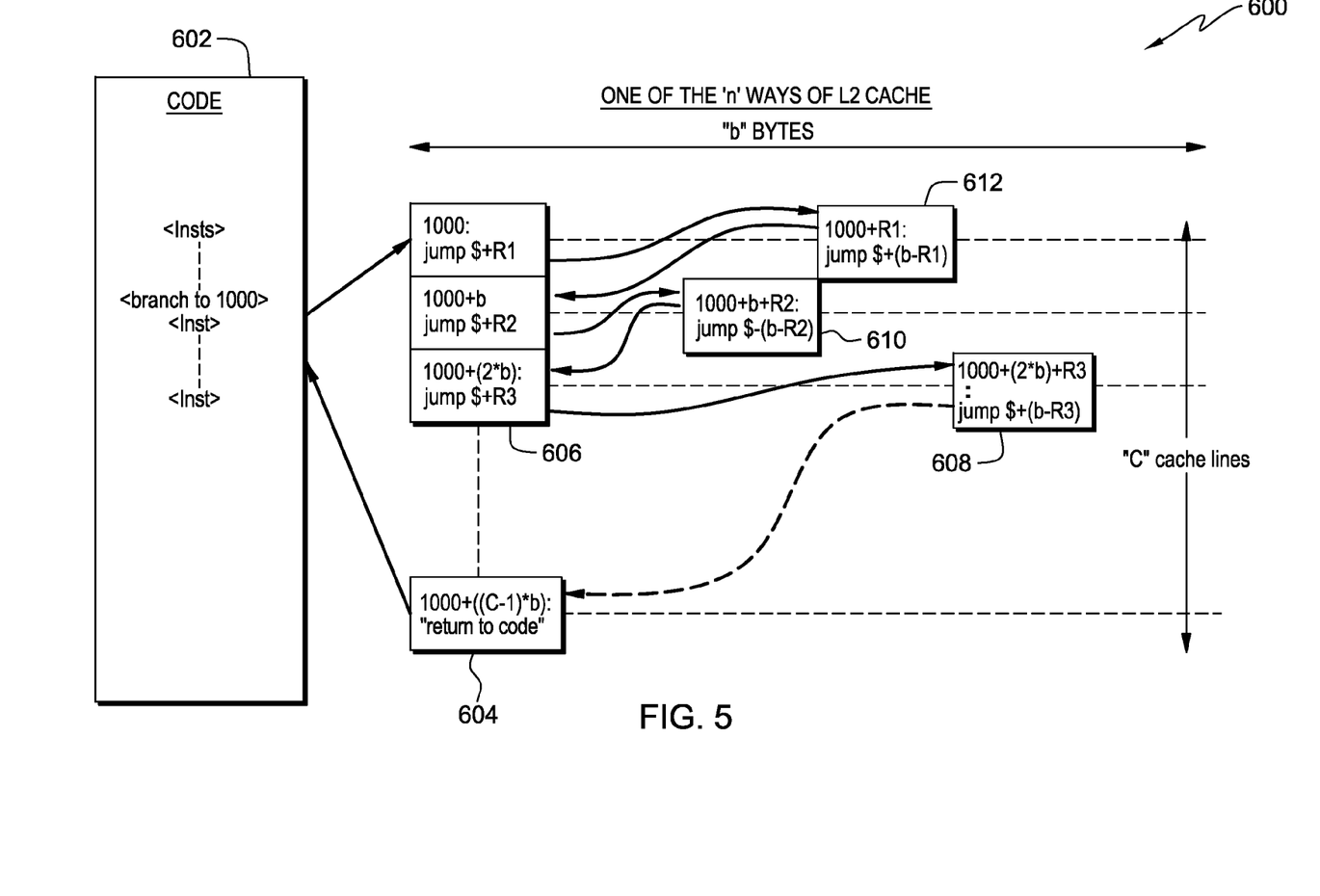
FIG. 5 is a diagram of an L2 cache undergoing the second embodiment process.

The execution of the branch instructions and return, performed at step S509, is shown schematically in diagram 600 of FIG. 5. Diagram 600 includes: code block 602; first random jump 612; second random jump 610; third random jump 608; and return to code instruction 604. The branching instructions shown in diagram 600 of FIG. 5 are "full traversal" because every cache line has at least one branching instruction. This set of instructions further qualifies as RFTBIs (see discussion of this term, above) because at least one branching instruction is at a random location within the cache line (except for the last line as the lines are taken in traversal order). This set of instructions further qualifies as TRFTBIs (see discussion of this term, above) because at least one branching instruction is at an end (in this example, the beginning end, see, for example, branch instruction 606) of each cache line (except for the last line which has "return to code" instruction instead of a branching instruction).

Diagram 600 of FIG. 5 shows the use of branches for instruction cache lock validation. This diagram shows how the branches will be placed in the cache lines and how they are executed at run-time from the code. FIG. 5 shows only one (1) way of an n-way associative cache and the starting location of the locked memory block is considered as 1000. Rx represents a random number which is less than b bytes (that is, size of the cache line) and is word-aligned. If the cache line size is b bytes, there can be "b/4" instruction words in a cache line. The second branch can reside at any of the subsequent "b/4" words within the cache line and its target will always be the start of the next cache line.

Processing proceeds to step S511 where the cache is checked to ensure that relevant locations are still in the correct way. Checking the cache, after jumping to the location multiple times from the code, it is effectively determined whether the content is successfully locked in the way. The second branch instruction is added in the same cache line to catch any possible corruption in the remainder of the cache line. This enhances the ability of this embodiment to detect an anomaly in a locked cache line and thus, improves validation of locked content. To further explain this embodiment of the checking process, step S511 includes verification of the content in the locked way by jumping to the branch instruction in one of the randomly picked cache lines in locked way, traversing the way and returning control to the caller function in the validation tool. This will be performed multiple times by selecting a cache line in locked way randomly every time. In case, any cache line or portion of it within locked way gets "clobbered" or corrupted or the relevant locations in locked way get replaced due to a hardware anomaly, the problem will be caught by virtue of execution of "invalid" content, in step S511. Such execution of "invalid" instruction will likely result in unexpected exceptions, and will be easily detected by the validation tool. In this manner, step S511 ensures that the relevant locations are still in the correct way.

This design can also be extended by putting branch instruction anywhere in the cache line and not necessarily in the beginning. Additional branches can also be added to improve coverage per cache line.

By using random jumps within a cache line the validation can cover different possible random scenarios, which are finite. It is not generally known by the designer of the validation tool is optimal for validation. For this reason, the RFTBI embodiments of the present disclosure target different portions of the cache line using random jump offsets, as discussed above.

Figure 6:
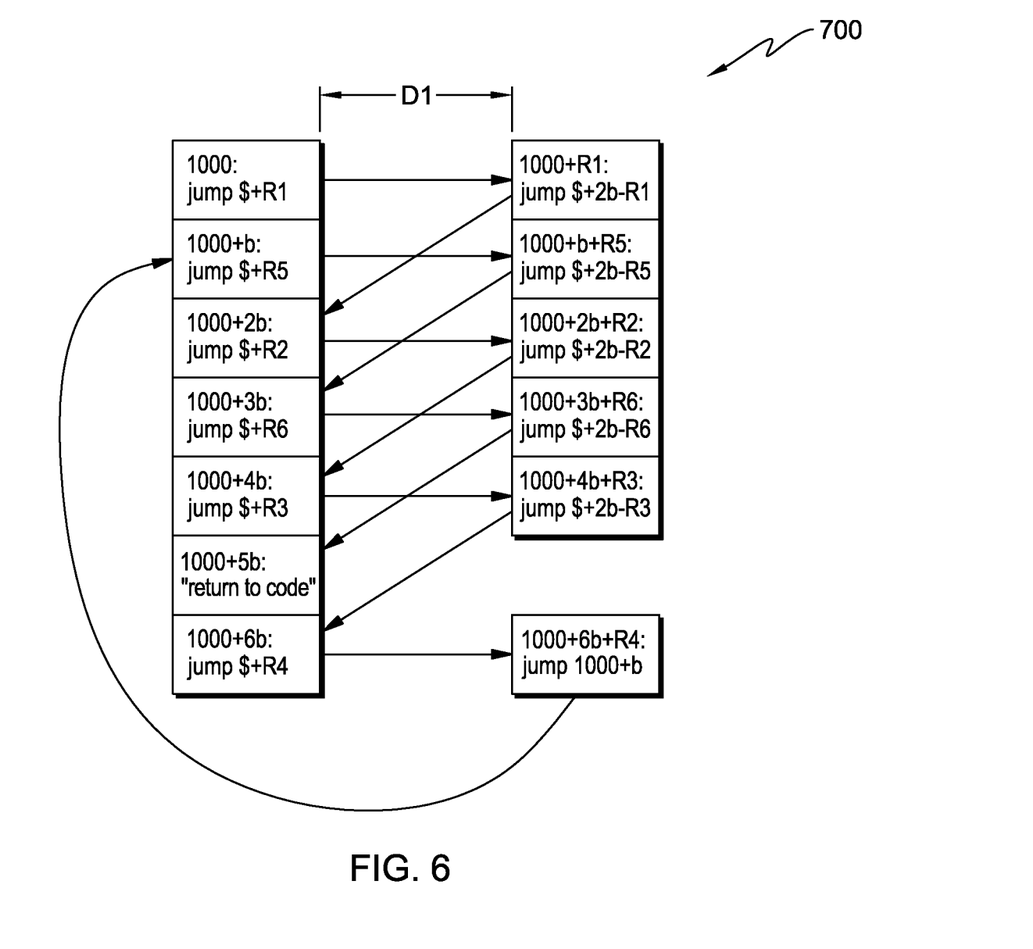
FIG. 6 is a diagram of an L2 cache undergoing a third embodiment of a process according to the present disclosure.

FIG. 6 shows a diagram 700 of another embodiment of TRFTBIs according to the present disclosure. It should be noted that the bit distance D1 will be different from cache line to cache line because this bit distance is assigned randomly on a line-by-line basis. Even though the lines are not traversed in order, they are traversed according to a pattern such that all lines are in the traversal path. There may even be embodiments of the present disclosure where there is no real pattern to the traversal order, but the branch instructions must ensure that each and every line in the way is hit in order for the instructions to be considered as "full traversal."

IV. Definitions

Present invention/present disclosure: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: non-exclusive or; for example, A and/or B means that: (i) A is true and B is false; or (ii) A is false and B is true; or (iii) A and B are both true.

Way: if a cache is not divided into ways then that entire cache should be considered as a "way."

Random: includes, but is not necessarily limited to, pseudo-random phenomena.

Device: may be comprised of part(s) or portion of a larger device or device(s).

What is claimed is:

1. A non-transitory computer readable storage medium having software stored on a software storage device, the software comprising:
   first program instructions programmed to write full traversal branching instructions in each and every line of a cache way of a cache memory device, the full traversal branching instructions perform a branching instruction on every line of the cache way in which the full traversal branching instructions are written; and
   second program instructions programmed to lock the cache way by adjusting cache locking data to indicate that any data in the cache way will not be overwritten during normal operations of the cache memory device.

2. The storage medium of claim 1 wherein the full traversal branching instructions are random full traversal branching instructions written at random locations in each and every line of the cache way.

3. The storage medium claim 2 wherein the random full traversal branching instructions are terminal random full traversal branching instructions written at random at the beginning, or end, of each and every line of the cache way.

4. The storage medium of claim 1 wherein the cache memory device has a hierarchy which can support locking of cache lines.

5. The storage medium of claim 1 wherein the software further comprises:
   third program instructions programmed to verify the locked cache way.

6. The storage medium of claim 5 wherein the third program instructions include the following:
   fourth program instructions programmed to jump to a location within a random cache line in the locked cache way that includes one of the full traversal branching instructions; and
   fifth program instructions programmed to check the cache memory device to determine whether locations of the full traversal branching instructions are still in the locked cache way.

7. The storage medium of claim 1 wherein the second program instructions are programmed to lock the cache way by a Replacement Management Table.

8. The storage medium of claim 1 wherein the software further comprises: third program instructions programmed to allocate a portion of the cache memory device for the full traversal branching instructions; and fourth program instructions programmed to populate the allocated portion of the cache memory device with the full traversal branching instructions.

9. The storage medium of claim 8 wherein the third and fourth program instructions are programmed to be performed at run-time.

10. A computer system comprising:
    a processor(s) set; and
    a software storage device;
    wherein: the processor set is structured, located, connected and/or programmed to run software stored on the software storage device; and the software comprises:
       first program instructions programmed to write full traversal branching instructions in each and every line of a cache way of a cache memory device, the full traversal branching instructions comprising a set of instructions that perform a branching instruction on each and every line of the cache way in which the full traversal branching instructions are written; and
       second program instructions programmed to lock the cache way by adjusting cache locking data to indicate that any data in the cache way will not be overwritten during normal operations of the cache memory device.

11. The system of claim 10 wherein the full traversal branching instructions comprise random full traversal branching instructions that are terminal random full traversal branching instructions.

12. The system of claim 10 wherein the full traversal branching instructions are random full traversal branching instructions written at random locations in each and every line of the cache way.

13. The system of claim 12 wherein the random full traversal branching instructions are not written at the last line in the random full traversal branching instructions order.

14. The system of claim 10 wherein the full traversal branching instructions are random full traversal branching instructions written at random at the beginning, or end, of each and every line of the cache way.

15. The system of claim 14 wherein the random full traversal branching instructions are not written at the last line in the random full traversal branching instructions order.

16. The system of claim 10 further including populating the each and every line of the cache way with at least two branching instructions per cache line.

17. The system of claim 16 wherein the at least two branching instructions per cache line include a branch at the beginning of each and every line of the cache way.

18. The system of claim 17 further including populating the each and every line with a plurality of branching instructions across various locations of each cache line to improve coverage per cache line.

19. The system of claim 10 wherein the software further comprises: third program instructions programmed to verify the locked cache way.

20. The system of claim 19 wherein the third program instructions include the following: fourth program instructions programmed to jump to a location within a random cache line in the locked cache way that includes one of the full traversal branching instructions; and fifth program instructions programmed to check the cache memory device to determine whether locations of the full traversal branching instructions are still in the locked cache way.

21. The system of claim 20 further including sixth program instructions to verify existence of the branch at the beginning of each and every line of the cache way so that processing can jump to the beginning of any random cache line.

\* \* \* \* \*